US009268672B1

(12) United States Patent
Gupta

(10) Patent No.: US 9,268,672 B1
(45) Date of Patent: Feb. 23, 2016

(54) AUTOMATED TEST CASE GENERATION FOR APPLICATIONS

(71) Applicant: Amazon Technologies, Inc., Reno, NV (US)

(72) Inventor: Suresh Chandra Gupta, Alwar (IN)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 14/287,902

(22) Filed: May 27, 2014

(51) Int. Cl.
*G06F 9/44* (2006.01)
*G06F 11/36* (2006.01)

(52) U.S. Cl.
CPC ........ *G06F 11/3684* (2013.01); *G06F 11/3664* (2013.01); *G06F 11/3688* (2013.01)

(58) Field of Classification Search
CPC ............ G06F 11/3668; G06F 11/3688; G06F 11/3664; G06F 11/3684
USPC .................................................. 717/125, 124
See application file for complete search history.

(56) References Cited

U.S. PATENT DOCUMENTS

| | | | | |
|---|---|---|---|---|
| 5,854,924 A * | 12/1998 | Rickel | G06F 11/3604 | 714/38.1 |
| 6,381,604 B1 * | 4/2002 | Caughran et al. | | 1/1 |
| 7,480,900 B1 * | 1/2009 | Zhou et al. | | 717/132 |
| 7,673,179 B2 * | 3/2010 | LaBanca et al. | | 714/38.14 |
| 8,561,036 B1 | 10/2013 | Beans et al. | | |
| 2004/0040014 A1 * | 2/2004 | Ball | G06F 11/3616 | 717/130 |
| 2008/0178154 A1 * | 7/2008 | Basler et al. | | 717/124 |
| 2008/0209567 A1 * | 8/2008 | Lockhart | G06F 11/3612 | 726/25 |
| 2009/0106597 A1 * | 4/2009 | Branca et al. | | 714/38 |
| 2009/0144698 A1 * | 6/2009 | Fanning | G06F 8/75 | 717/120 |
| 2010/0281248 A1 * | 11/2010 | Lockhart | G06F 11/3612 | 713/150 |
| 2011/0173693 A1 * | 7/2011 | Wysopal | G06F 11/3612 | 726/19 |
| 2012/0102458 A1 * | 4/2012 | Meijer | G06F 8/73 | 717/123 |

OTHER PUBLICATIONS

Oleksii Starov, "Cloud Platform for Research Crowdsourcing in Mobile Testing", Apr. 2013.*
Starov et al., "Integrated TaaS Platform for Mobile Development Architecture Solution", 2013.*
Isak Farnlycke, "Functional testing through log file analysis of test cases developed from use cases", Jan. 27, 2013.*
Yu et al., "Testing as a Service Over Cloud", 2010.*
"Automated Testing Solutions for Android", InfoQ, <<http://www.infoq.com/news/2011/09/Android-Testing>>, Abel, Averam, Sep. 30, 2011, 14 pages.
"Robotium for Beginners", retrieved on Aug. 11, 2014 at <<https://robotium.googlecode.com/files/RobotiumForBeginners.pdf>>, 13 pages.
"Robotium Test cases for Android", Stackoverflow,com, <<http://stackoverflow.com/questions/7308280/robotium-test-cases-for-android>>, Sep. 21, 2011, 2 pages.
"UI Testing", Android Developers, retrieved on Aug. 11, 2014 at <<http://developer.android.com/tools/testing/testing_ui.html>>, 9 pages.

* cited by examiner

*Primary Examiner* — Phillip H Nguyen
(74) *Attorney, Agent, or Firm* — Lee & Hayes, PLLC

(57) ABSTRACT

Some implementations include receiving an application binary file for an application to be tested. One or more static analysis operations may be performed on the application binary file to identify application parameters. In some cases, keywords may be associated with individual application parameters, and the keywords may be used to query a test case repository in order to identify test cases. The identified test cases may be used to generate a test plan, and at least a portion of the test plan may be automatically executed in some cases. A test report may be generated that includes a list of test case failures and potential solutions, and the test report may be sent e.g., to a third-party developer or an approval engineer for review.

20 Claims, 9 Drawing Sheets

200

PERFORM STATIC ANALYSIS ON AN APPLICATION BINARY FILE TO IDENTIFY ONE OR MORE APPLICATION PARAMETERS
202

DETERMINE ONE OR MORE KEYWORDS THAT ARE ASSOCIATED WITH THE INDIVIDUAL APPLICATION PARAMETER(S)
204

QUERY A TEST CASE REPOSITORY TO IDENTIFY ONE OR MORE TEST CASES THAT ARE ASSOCIATED WITH THE KEYWORD(S)
206

CAUSE DISPLAY OF A TEST PLAN GENERATION USER INTERFACE THAT INCLUDES INFORMATION ASSOCIATED WITH THE TEST CASE(S)
208

FIG. 2

AUTOMATED TEST CASE GENERATION FOR APPLICATIONS

BACKGROUND

There may be numerous challenges associated with developing and testing a software application, particularly in cases where the application is being developed by a third-party developer. For example, it may be difficult for a third-party developer to know how to develop an application on a particular platform, what to test, and how to fix issues in the application before submitting the application for launch (e.g., via an application store). Further, it may be difficult for a tester (e.g., an approval engineer) to verify compatibility of an application developed by a third-party developer prior to launch. For example, the tester may have a large number of applications developed by third-party developers for review, and the tester may not have low-level information on the application. As such, it may be difficult for the tester to determine what to test for a particular application, without potentially devoting a large amount of time to the particular application.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates an example process for automated application testing, according to some implementations.

DETAILED DESCRIPTION

This disclosure includes, in part, techniques and arrangements for automatic test case generation. In some cases, test case generation may include generating possible test cases for execution on a given application and may include identifying how to fix issue(s) if a particular test case fails in testing. This may be useful to testing teams that may be involved in testing external (i.e., third-party) applications prior to launch (e.g., via an application store). Additionally, this may be useful for the third-party application developers in order to know how to develop an application on a particular platform, what to test, and how to fix issues in the application before submitting the application for launch (e.g., via the application store).

While the present disclosure may refer to particular types of applications for illustrative purposes, the concepts described may be applicable in a variety of contexts. For example, the system of the present disclosure may be applicable to various platform providers for external developers. As another example, the system of the present disclosure may be applicable to entities that provide a large number of applications. That is, the concepts described in the present disclosure may be applicable not only to application stores but also to device manufacturers, social networking sites, Internet browsers, gaming consoles, or "smart" televisions, among other alternatives.

Figure 1:
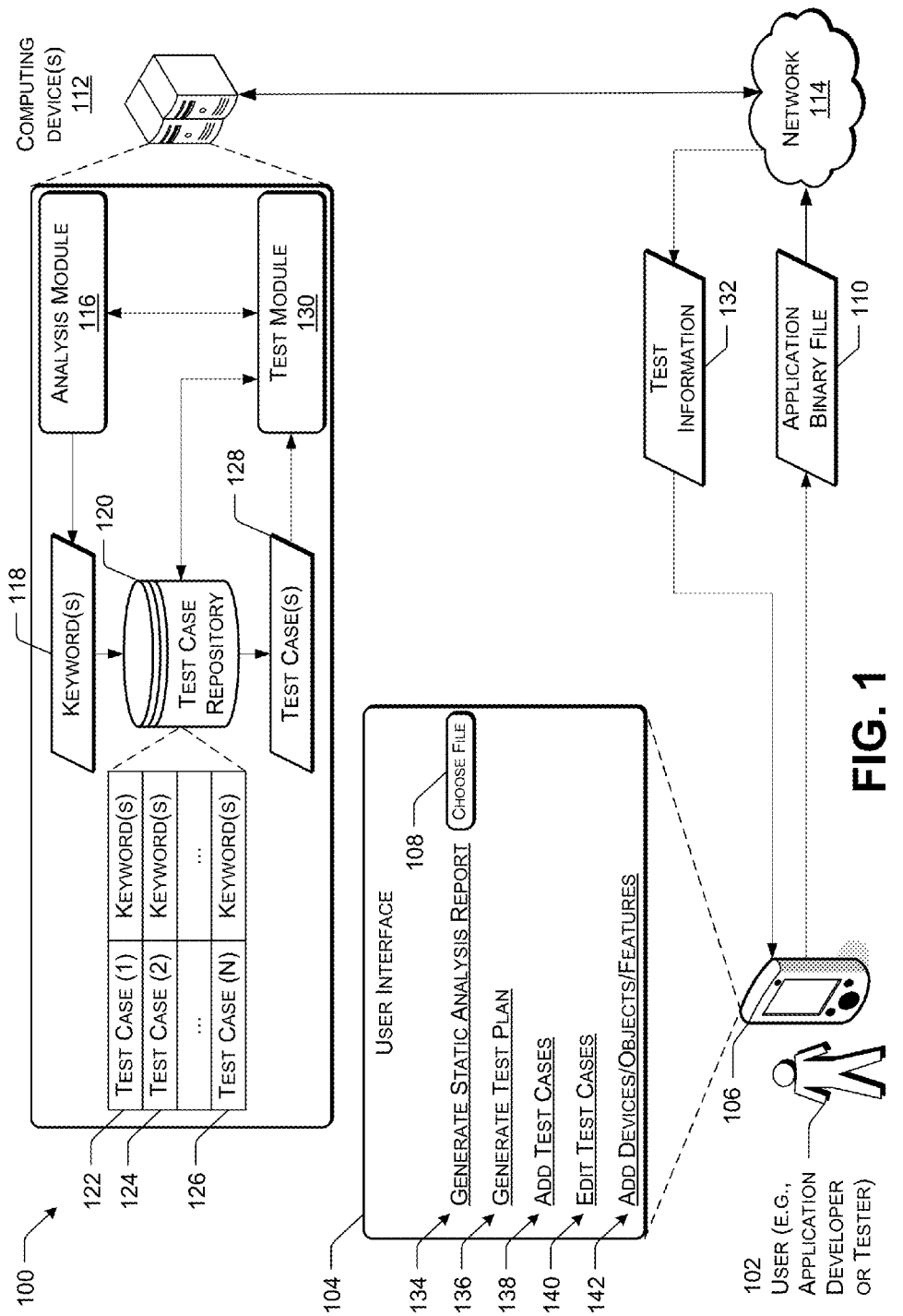
FIG. 1 illustrates an example of a framework for automated application test case determination, according to some implementations.

FIG. 1 illustrates an example framework 100 for automated application test case generation, according to some implementations. In the example of FIG. 1, a user 102 (e.g., a third-party application developer) may access a user interface 104 that may be presented via an electronic device 106. Static analysis of one or more files (e.g., an application binary file) associated with an application to be tested may allow for automatic identification of one or more test cases.

In some cases, automated application test case generation may be useful for approval of applications developed by third parties to be launched via a platform such as an application store. In the context of an application store, there may be a large volume of applications developed by third-party developers to be tested prior to launch e.g., for compliance with particular criteria. The automated application testing of the present disclosure may improve testing efficiency by providing a clear set of test cases to be executed for a particular application. This process may add value because an approval engineer may not be familiar with an application that was developed by a third-party developer. Automated application analysis and test case generation may assist the approval engineer to identify what to test. Further, testing efficiency may be improved by assigning particular applications to different approval engineers that may have different skill sets. For example, an application that uses an in-application purchase function may be assigned to an approval engineer with experience with testing in-application purchase functionality.

In the example of FIG. 1, the user interface 104 may include a first option 108 that is selectable by the user 102 to identify an application binary file 110 associated with an application to be tested. In response to selection of the first option 108, another interface (not shown) may be displayed that may allow the user 102 to choose the application binary file 110 (e.g., from a list of files that are accessible via the electronic device 106).

In some cases, the application binary file 110 can be an application package file (APK) format file that is used to distribute and install application software and middleware onto Android® operating system, and certain other operating systems, such as Blackberry® OS. To make an APK file, a program for Android is compiled, and then all of its parts are packaged into one file. An APK file contains all of that program's code (such as .dex files), resources, assets, certificates, and the manifest file. APK files can have any name needed, provided that the file name ends in ".apk". A manifest file enumerates the files which are included in the distribution, either for processing by various packaging tools, or for human consumption. The APK file can also include (i) a directory containing the compiled code that is specific to a software layer of a processor, (ii) a directory containing resources not compiled into resources.arsc, (iii) a directory containing applications assets, which can be retrieved by AssetManager, (iv) an additional Android manifest file, describing the name, version, access rights, referenced library files for the application. This file may be in Android binary XML that can be converted into human-readable plaintext XML with tools such as AXMLPrinter2, apktool, or Androguard, (v) the classes compiled in the dex file format understandable by the Dalvik virtual machine, and (vi) resources.arsc, a file containing pre-compiled resources, such as binary XML for example.

The electronic device 106 may be implemented as any of a number of electronic devices, such as a smart phone, an eBook reader, a media player, a tablet computing device, a portable gaming device, a portable digital assistant, a laptop or netbook computer, and so forth. Furthermore, the electronic device 106 may not necessarily be a mobile or portable device, and thus, in some implementations may include a display of a desktop or other computing device, a gaming system, a television, other home electronics devices, and so forth.

The application binary file 110 identified by the user 102 may be sent to one or more computing devices 112 via at least one network 114. The one or more computing devices 112 may include an analysis module 116 to perform static analysis on the application binary file 110. For example, the static analysis may include determining basic details about the application, such as user permission(s) being used (e.g., a RECEIVE_SMS permission for an application that monitors incoming SMS messages), application programming interface(s) being used, hardware/software features being used, or layout object(s) and/or style details, among other alternatives. That is, static analysis may represent a mechanism to read the application binary file 110 and identify parameter(s) that may provide the list of things that the application may be using.

The analysis module 116 may be configured to identify one or more keywords 118 that are applicable to the application binary file 110 based on the static analysis of the application binary file 110. A particular embodiment of identifying the keyword(s) 118 is described in further detail with respect to FIGS. 2 and 3. In some cases, multiple tools (e.g., open source tools) may be available for analyzing the application binary file 110. In some contexts, static analysis may be used for checking code quality, dead code, nullness, and/or use of restricted APIs. However, the present disclosure describes the use of static analysis to gather a list of various possible test areas applicable for that application. In some cases, apart from the automated static analysis, manual analysis may also be performed in order to check the features and/or test areas to be tested for the given application.

The one or more computing devices 112 may further include a test case repository 120 that includes a plurality of test cases 122 that may be tagged with keyword(s) for use in determining the applicability of a particular test case to a particular application. As an illustrative, non-limiting example, the test case(s) related to camera may be tagged with a 'Camera' keyword in the test case repository 130. As another example, test case(s) related to in-application purchase APIs may be tagged with an 'IAP' keyword in the test case repository 130. In the embodiment illustrated in FIG. 1, the test case repository 120 includes N test cases, including a first test case 122 (identified as "Test Case(1)" in FIG. 1), a second test case 124 (identified as "Test Case(2)" in FIG. 1), up to an Nth test case 126 (identified as "Test Case(N)" in FIG. 1).

In some embodiments, the test cases in the test case repository 120 may be defined based upon applicability to particular devices as well. As an example, the 'CAMERA' feature may not be available on a first generation of a device from a particular manufacturer, while the 'CAMERA' feature may be available on a subsequent generation of the device. Therefore, the list of test cases for the same application on these devices may be different. To illustrate, the list of test cases for the first generation of the device may be related to the graceful handling of the absence of the 'CAMERA' feature. By contrast, the list of test cases for the subsequent generation of the device may be normal camera-related test cases. The same concept may apply for various other hardware and software features associated with different versions/generations of a particular device. That is, the list of test cases for a particular device may represent test cases that are particularly designed for execution on the application on the particular device.

The analysis module 116 may be configured to query the test case repository 120 based on the one or more keywords 118 in order to identify one or more test cases 128 that are applicable to the application binary file 110. The test case(s) 128 may include not only the applicable test steps but also the associated test case description, success criteria, priority, among other details. Further, an individual test case may provide a technical blurb to suggest to the user 102 what to do if the particular test case is failing for the application. Therefore, the test case(s) 128 may provide numerous details regarding what to test, how to test and how to fix a problem in the event that a problem is detected. Further, the test case(s) 128 may include the tests generic guidelines such as privacy, performance, and/or security. In some cases, those test cases may be included for the applications by default.

The one or more computing devices 112 may further include a test module 130. In some embodiments, the test module 130 may be used to create a test plan based on the test case(s) 128 from the test case repository 120. The test module 130 may be further configured to generate test information 132 to be sent to the electronic device 106 (e.g., via the network 114). Some of the test case(s) 128 may be executed automatically, while some of the test case(s) 128 may be executed manually. As such, the test module 130 may automatically execute one or more automatic tests on the application and capture the results and may provide information regarding the manual test cases to be executed, with the associated results to be manually recorded (see e.g., the test plan 400 of FIG. 4).

Figure 7:
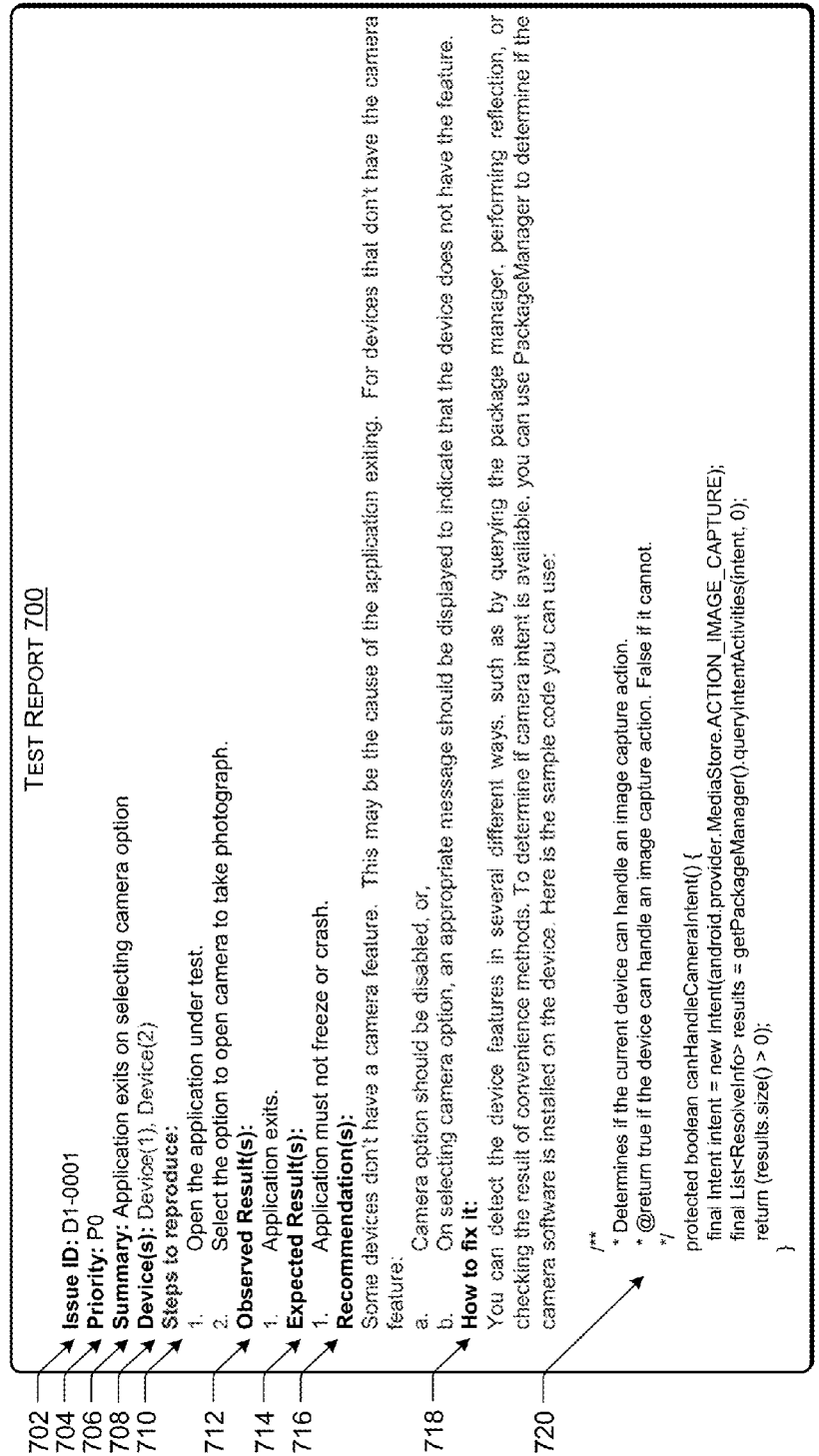
FIG. 7 illustrates an example of a test report that may be provided to a user (e.g., a third-party application developer or a tester), according to some implementations.

Once the automatic and manual test runs are completed, the test module 130 may generate a test report (see e.g., the test report 700 of FIG. 7). That is, based on the results of the test cases executed, the test report may be generated automatically with the list of test case failures and (optionally) technical blurbs to help in fixing those issues. In some embodiments, this report can be directly sent to the user 102 (e.g., the application developer), potentially allowing the developer to more quickly fix the identified issues.

In the embodiment illustrated in FIG. 1, the user interface 104 may include a second option 134 that is selectable by the user 102 to generate a static analysis report, a third option 136 to generate a test plan (see e.g., FIGS. 3 and 4), a fourth option 138 to add test cases (see e.g., FIG. 6), a fifth option 140 to edit test cases, and a sixth option 142 to add devices, objects, and/or features. Thus, in the example of FIG. 1, a user (e.g., a third-party developer) may submit an application binary file for automatic static analysis and automated generation of one or more test cases.

Figure 3:
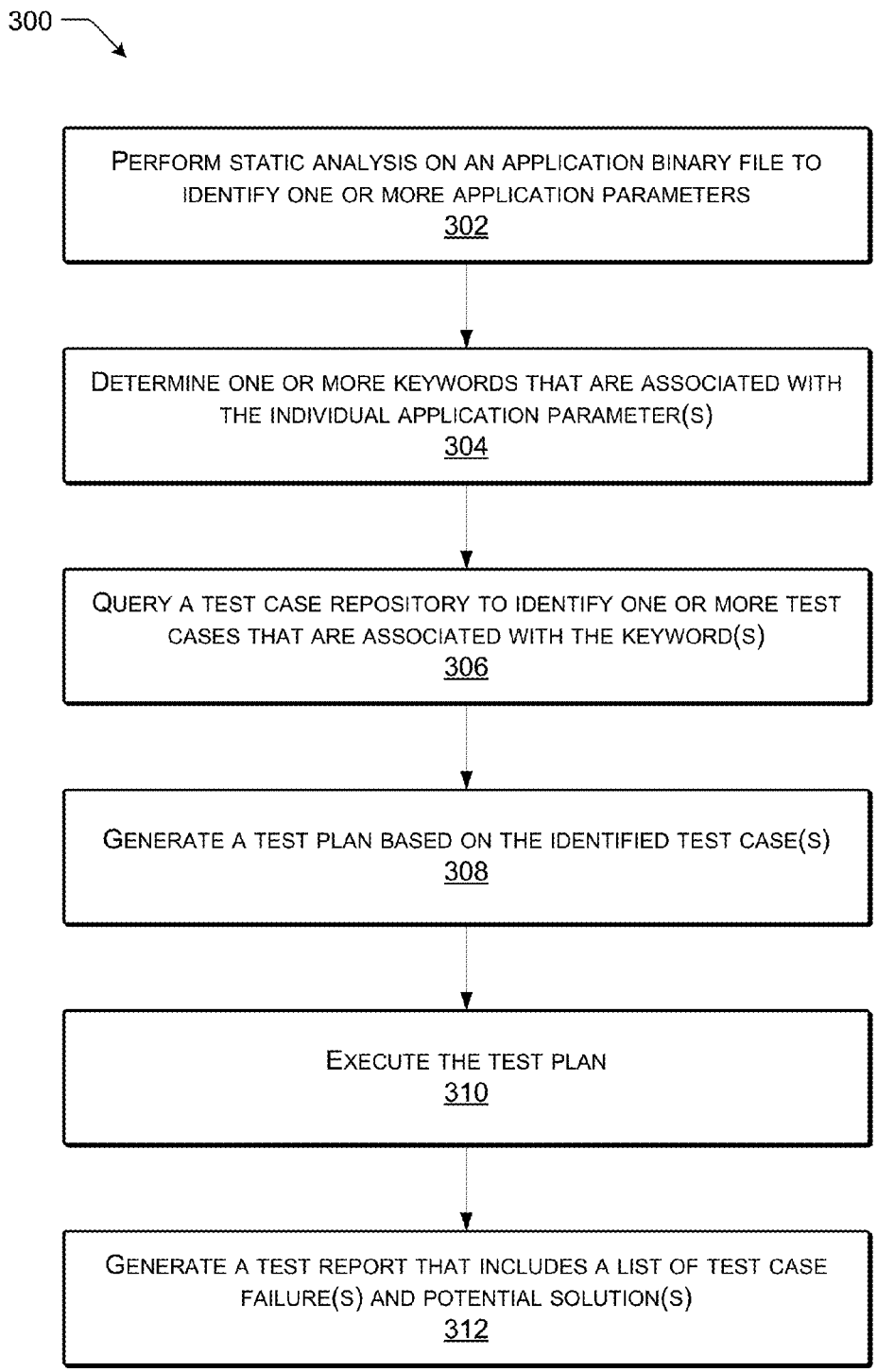
FIG. 3 illustrates another example process for automated application testing, according to some implementations.

FIGS. 2 and 3 illustrate example processes 200 and 300 for automated test case generation, as described above. FIGS. 2 and 3 illustrate the processes 200 and 300 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

Referring to FIG. 2, an example process for automated test case generation is illustrated and generally designated 200. In the example of FIG. 2, the process 200 includes performing static analysis on an application binary file, determining keyword(s) for querying a test case repository to identify test case(s) that are associated with the keyword(s). In some cases, the process may include causing display of a test plan generation user interface (see e.g., FIG. 4) that includes information associated with the identified test case(s) for use e.g., by a tester of the application or by a developer of the application.

At 202, the process 200 includes performing static analysis on an application binary file to identify one or more application parameters. For example, referring to FIG. 1, the user 102 may send the application binary file 110 to the one or more computing devices 112 via the network 114. The analysis module 116 may perform static analysis on the application binary file 110 to identify application parameter(s) associated with the application binary file 110. To illustrate, in some cases, the application parameter(s) associated with the application binary file 110 may include user permission(s) being used, application programming interface(s) being used, hardware/software features being used, or layout object(s) and/or style details, among other alternatives.

In some embodiments, the application binary file 110 may include an archived file (e.g., an "apk" file) that may be analyzed by the analysis module 116 to identify the application parameter(s). For example, the analysis module 116 may un-archive the archived file and analyze one or more associated files (e.g., a manifest file that presents various types of information regarding an application before a system runs the application's code, one or more layout files that may define a visual structure for a user interface such as the user interface for an activity or application widget, and a classes file that in some cases may represent files that are converted into a particular virtual machine format before installation on a device). As an illustrative, non-limiting example, analyzing the manifest file may include determining a version of an operating system, determining one or more software development kit (SDK) versions, and determining one or more user permissions. As another illustrative example, analyzing the layout files may include capturing the type of layout (e.g., relative, linear, webview) and list of various layout objects (e.g., buttons, menus, text fields, grid, media player, scroll bars, etc.) that may be used by the application. As a further example, analyzing the classes file may include determining information associated with the application such as APIs and corresponding versions, packages, classes, method names, call graph, among other alternatives.

At 204, the process 200 includes determining one or more keywords that are associated with the individual application parameter(s). For example, referring to FIG. 1, the analysis module 116 may determine the keyword(s) 118 that are associated with the individual application parameters.

Based on the list of features, objects, permissions, etc. gathered from the static analysis, different tags may be defined. As an illustrative example, for a particular application platform, multiple user permissions may be available. Each of the user permissions may be mapped to a different keyword/tag. As an illustrative, non-limiting example, a 'RECEIVE_SMS' permission may allow the application to get short messaging service (SMS) messages. Therefore, the test cases to test the SMS receiving feature may be tagged with a 'RECEIVE_SMS' keyword. As another illustrative example, multiple APIs (e.g., an in-application purchase API, a maps API, etc.) may be provided by a particular platform. In this case, static analysis may identify these APIs, and the test cases may be mapped to the particular APIs. Upon static analysis, each keyword may be captured. Further, in some cases, one or more default keywords may be applied to the application. Illustrative examples of such keywords may include performance, privacy, security, or fluidity, among other alternatives.

At 206, the process 200 includes querying a test case repository to identify one or more test cases that are associated with the keyword(s). For example, referring to FIG. 1, the analysis module 116 may query the test case repository 130 to identify the test case(s) 128 that are associated with the keyword(s) 118. As an illustrative, non-limiting example, the test case(s) related to camera may be tagged with a 'Camera' keyword in the test case repository 130. As another example, test case(s) related to in-application purchase APIs may be tagged with an 'IAP' keyword in the test case repository 130.

At 208, the process 200 includes causing display of a test plan generation user interface that includes information associated with the identified test case(s). In some embodiments, the test plan generation user interface may identify various possible test areas that may be applicable for the application. For example, the possible test areas may include one or more devices for testing, one or more features for testing, or one or more objects for testing, among other alternatives.

Referring to FIG. 3, another example process for automated test case generation is illustrated and generally designated 300. In the example of FIG. 3, the process 300 includes performing static analysis on an application binary file, determining keyword(s) for querying a test case repository, generating a test plan based on test case(s) identified in the test case repository, and executing the test plan. FIG. 3 further illustrates a particular case in which a test report is generated that identifies test case failure(s) and potential solution(s) for use e.g., by a third-party developer or a tester.

At 302, the process 300 includes performing static analysis on an application binary file to identify one or more application parameters, at 302. For example, referring to FIG. 1, the user 102 may send the application binary file 110 to the one or more computing devices 112 via the network 114. The analysis module 116 may perform static analysis on the application binary file 110 to identify application parameter(s) associated with the application binary file 110.

At 304, the process 300 includes determining one or more keywords that are associated with the individual application parameter(s). For example, referring to FIG. 1, the analysis module 116 may determine the keyword(s) 118 that are associated with the individual application parameters.

At 306, the process 300 includes querying a test case repository to identify one or more test cases that are associated with the keyword(s). For example, referring to FIG. 1, the analysis module 116 may query the test case repository 130 to identify the test case(s) 128 that are associated with the keyword(s) 118.

At 308, the process 300 includes generating a test plan based on the identified test case(s). At 310, the process 300 includes executing the test plan. For example, referring to FIG. 1, the test module 130 may generate a test plan based on the identified test case(s) 128 and may execute at least a portion of the test plan (e.g., the automatically executable test cases). As described above, one or more of the test cases may represent manually executable test cases (see e.g., the test plan 400 of FIG. 4).

At 310, the process 300 includes generating a test report that includes a list of test case failure(s) and potential solution(s). For example, referring to FIG. 1, the test module 130 may generate the test information 132 that may include a list of test case failure(s) and potential solution(s). As an illustrative, non-limiting example, the test report 700 of FIG. 7 includes an example of a test case failure (e.g., "Application exits on selecting camera option") as well as an example of potential solution(s) (e.g., the "How to fix it:" area 718).

For some companies that utilize an application store with applications from third-party developers, testing the bulk of such applications in a timely manner may be difficult. For example, a tester may spend a significant amount of time to determine what to test for a particular application and what not to test for the particular application. In some cases, the tester may miss certain test areas/cases that may be important. FIGS. 1 and 2 illustrate that the system of the present disclosure may improve productivity by automatically determining particular test cases that are to be performed. Further, the test report provides the technical blurb to help the developer on how to fix the issue. In some cases, this may result in a faster turnaround time, which is useful not only to the company but also to the developer.

FIGS. 1-3 further illustrate that application developers may utilize the system of the present disclosure in early development cycle to ensure that the application is designed with what is expected. On completion of the abstract design idea on the application to be developed, the developer may use this tool to manually select/specify target devices (e.g., via check boxes), features, APIs and objects to be used to generate the test cases. The developer can review the test cases and associated technical blurbs. Such information may help the developer in directly using code snippets and speeding up the coding by providing substantially real-time feedback on test case(s) and potential solution(s) in the event of a test failure.

FIGS. 1-3 further illustrate that the developers and their testing team can use this tool to verify the test cases to be executed on the applications before submitting the applications to the application store for launch. The tool provides a quick reference for the developers and their testing team to define the basic expectation and quality criteria to meet and may help improve turnaround time for making the application available for use/sale.

Thus, with respect to business value, the system of the present disclosure may improve productivity in terms of testing the applications submitted for approval to the application store. As such, more applications may be launched in less time. Further, with respect to business value, the system of the present disclosure may provide better test reports to developers, potentially allowing developers to fix issues faster and potentially improving the developer's trust in the company that provides the application store. Further, with respect to business value, by sharing the automated test case generation tool with a developer, the developer may develop an application faster and ensure that the application meets a quality threshold before submission. Further, sharing the tool may result in faster time to market and potentially better business not only for the third-party developers but also for the company that provides the marketplace for the application (e.g., the application store).

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Figure 4:
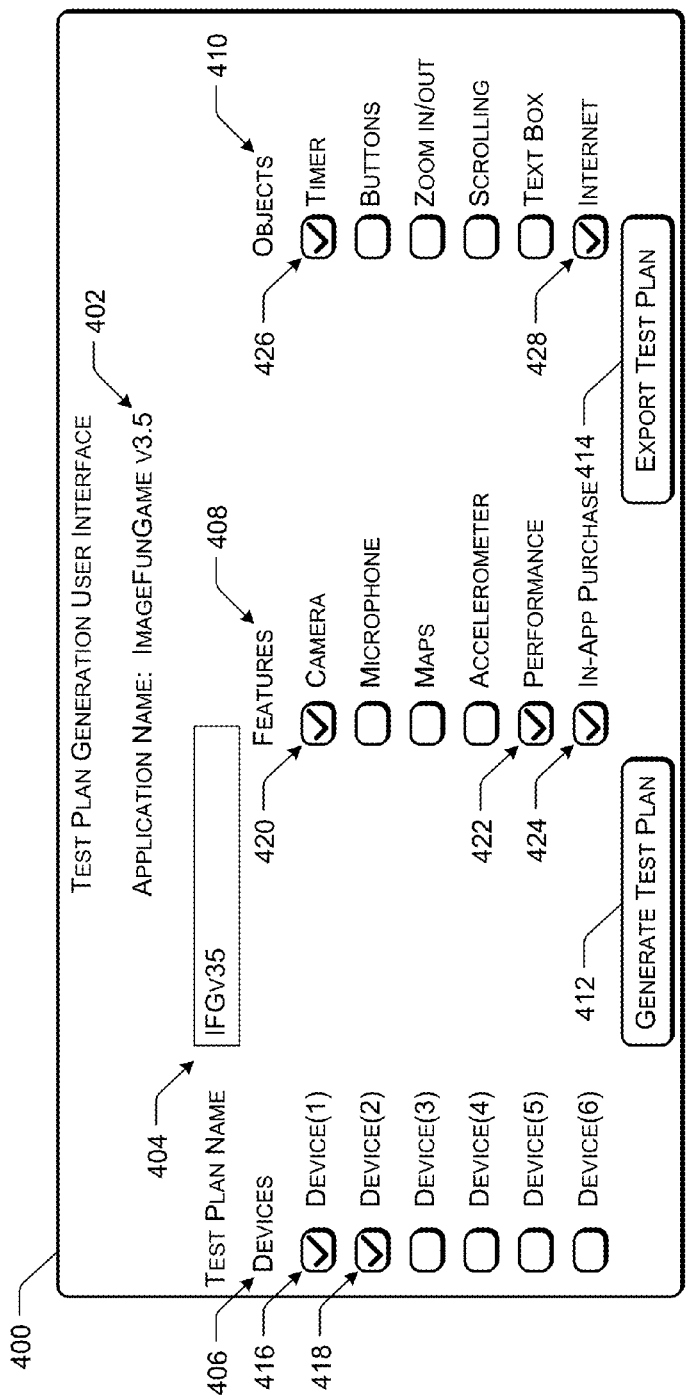
FIG. 4 illustrates an example of a user interface that includes various user selectable options for generating a test plan, according to some implementations.

Referring to FIG. 4, a particular example of a test plan generation user interface 400 is illustrated. In some cases, the test plan generation user interface 400 may be provided to a tester (e.g., an approval engineer associated with a particular platform). Alternatively, the test plan generation user interface 400 may be provided directly to the third-party developer of the application under test. In the particular example of FIG. 4, the user is provided with a first selectable option to generate a test plan and a second selectable option to export a test plan (e.g., in a spreadsheet format).

In some embodiments, the test plan generation user interface 400 of FIG. 4 may be automatically generated and displayed based on the results of the static analysis of the application binary file 110, as described above with respect to FIGS. 1-3. That is, in some cases, the test plan generation user interface 300 may be presented with one or more automatically selected options for testing a particular application based on the static analysis results of the application binary file 110 associated with the particular application. Thus, FIG. 4 illustrates that the test plan generation user interface 400 may allow the user to review the automatically selected option(s) as well as select additional items for testing (e.g., a particular device on which the application is to be tested).

In alternative embodiments, the test plan generation user interface 400 of FIG. 4 may be generated and displayed in response to user selection of the generate test plan option 136 presented via the user interface 104 of FIG. 1. For example, if the application to be tested is not already available, the user 102 may directly select the generate test plan option 136 and manually select one or more tags to generate the appropriate test cases for the application to be tested.

In the example of FIG. 4, the test plan generation user interface 400 identifies a name 402 of an application (e.g., "ImageFunGame v 3.5"), a test plan name 404 (e.g., "IFGv35") and various possible test areas that may be applicable for the application. For example, the possible test areas may include one or more devices 406 for testing, one or more features 408 for testing, or one or more objects 410 for testing, among other alternatives. The test plan generation user interface 400 further includes a first selectable option 412 to generate a test plan. Further, in the particular embodiment illustrated, the test plan generation user interface 400 also includes a second selectable option 414 to export a test plan (e.g., in a spreadsheet format).

In the example illustrated in FIG. 4, a checkmark icon is used to illustrate that a particular device, feature or object has been selected. However, this is for illustrative purposes only, and various other methods of identifying selected items may be employed (e.g., highlighting, underlining, font change, etc.). FIG. 4 illustrates a particular example in which the selected devices include a first device 416 (identified as "Device(1)" in FIG. 4) and a second device 418 (identified as "Device(2)" in FIG. 4). FIG. 4 further illustrates that the selected features include a Camera feature 420, a Performance feature 422, and an in-application purchase (IAP) feature 424. FIG. 4 also illustrates that the selected objects include a Timer object 426 and an Internet object 428. It will be appreciated that a tester may select to add and/or remove particular selected devices, features or objects as desired in order to automatically generate a test plan with multiple test cases that are relevant for the particular selected devices, features and/or objects.

Figure 5:
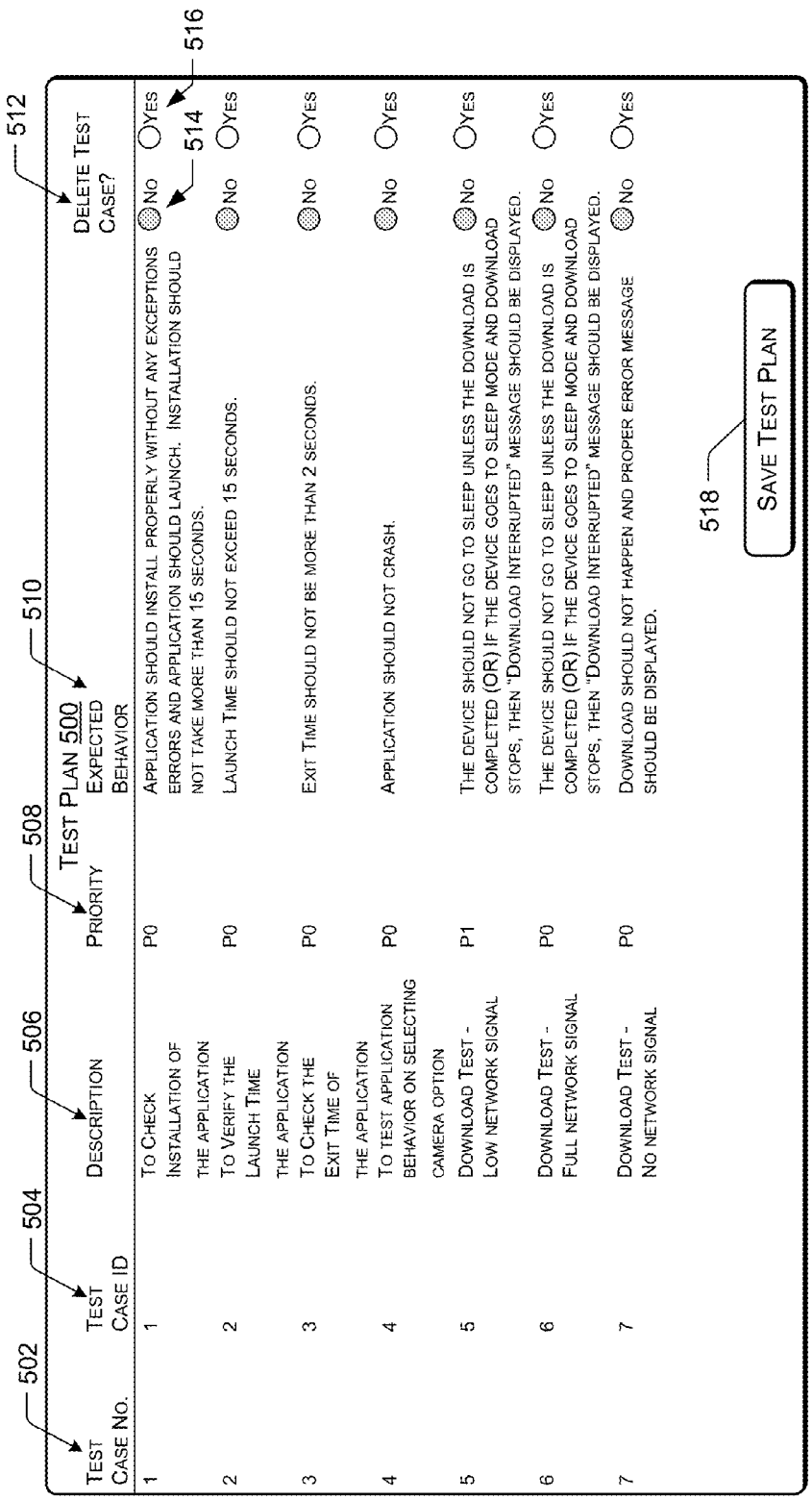
FIG. 5 illustrates an example of a test plan that may be provided to a user (e.g., a third-party application developer or a tester), according to some implementations.

Referring to FIG. 5, a particular example of a test plan 500 is illustrated. In some cases, the test plan 500 may be provided to a tester (e.g., an approval engineer associated with a particular platform). Alternatively, the test plan 500 may be provided directly to the third-party developer of the application under test. In some cases, the test plan 400 of FIG. 4 may be generated in response to selection of the first selectable option 412 of FIG. 4 (i.e., the "Generate Test Plan" option).

In the example of FIG. 5, the test plan 500 identifies various types of information for multiple test cases. To illustrate, for individual test cases, the test plan 500 may identify a test case number 502, a test case identifier (ID) 504, a description 506, a priority 508, an expected behavior 510. FIG. 5 further illustrates a particular embodiment in which a tester may be presented with an option 512 to delete one or more of the test cases. In some cases, a first selectable option 514 (e.g., a "No" option) may represent a default selection, while a second selectable option 516 (e.g., a "Yes" option) may be used to remove a particular test case from the test plan 500. FIG. 5 further illustrates that the tester may be presented with a selectable option 518 (e.g., a "Save Test Plan" control) to save the test plan 500.

As an illustrative example, for the first test case in the test plan 500 (i.e., the test case with "1" as the test case number 502), the test case ID 504 includes the number "1" and the description 506 indicates that the first test case is designed "to check installation of the application." Further, the priority 508 associated with the first test case is identified as P0, and the expected behavior 510 indicates that the "application should install properly without any exceptions errors and application should launch" and that "installation should not take more than 15 seconds." A tester may save the test plan 500 by selecting the "Save Test Plan" control 518.

Figure 6:
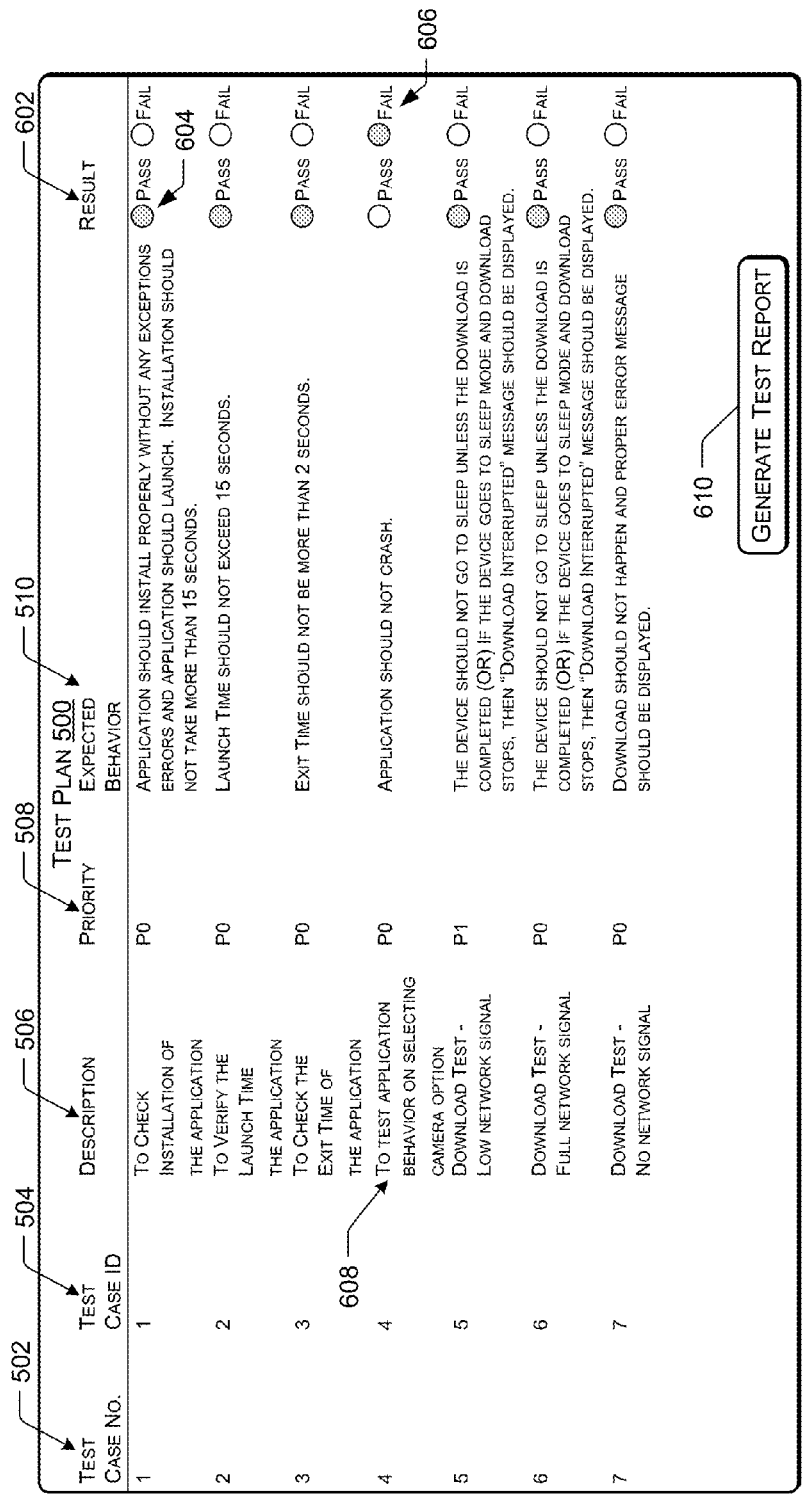
FIG. 6 illustrates an example of a test plan that may be provided to a user (e.g., a third-party application developer or a tester), according to some implementations.

FIG. 6 illustrates that the test plan 500 may identify a result (e.g., pass or fail) associated with execution of the individual test cases. Further, the user may select to generate a test report to provide further information regarding one or more test case failures.

For example, in the embodiment illustrated in FIG. 6, a result 602 associated with execution of a particular test case may include a first result 604 (e.g., a "Pass" result) or a second result 606 (e.g., a "Fail" result). In the example illustrated in FIG. 6, the result 602 associated with a particular test case 608 (e.g., with the description 506 of "To Test Application Behavior on Selecting Camera Option") is identified as having failed.

FIG. 6 further illustrate that the tester may be presented with a selectable option 610 to generate a test report that includes additional information associated with test case failure(s).

Referring to FIG. 7, a particular example of a test report 700 is illustrated. Based on the results of one or more test cases that are executed, the test report 700 may be generated automatically with a list of test failures and (optionally) technical blurbs that may help in identifying and fixing the cause of the test case failures. In some cases, the test report 700 may be provided to a tester (e.g., an approval engineer associated with a particular platform). Alternatively, the test report 700 may be provided directly to the third-party developer of the application under test.

In some embodiments, the test report 700 may include an issue identifier (ID) 702 assigned to an issue, a priority 704 associated with the issue, a summary 706 of the issue, one or more devices 708 that were selected for testing, one or more steps 710 to reproduce the issue and one or more observed results 712. In the example of FIG. 7, the summary 706 of the issue indicates that the "application exits on selecting camera option." The test report 700 further indicates that the application was tested on Device(1) and Device(2). The test report 500 further identifies that the steps 710 to reproduce the issue (i.e., the application exiting on selecting the camera option) include opening the application under test (i.e., step "1") and then selecting the option to open the camera to take a photograph (i.e., step "2").

The test report 700 further identifies the observed result(s) 712 (e.g., the application exits). For example, referring to FIG. 1, the test module 130 may store the observed result(s) 712 as part of the test case data associated with one of the particular test case(s) 128 in the test case repository 120. When a tester marks a test case "FAIL," the test module 130 may automatically store the details associated with the failure in the test case repository 120. Additional comment(s) from the tester may also be stored in the observed result(s) 712 as part of the test case data in the test case repository 120.

The test report 700 further includes one or more expected results 714 for comparison to the observed result(s) 712. For example, in this case, the expected results 714 indicate that the "application must not freeze or crash." The test report 700 further includes one or more recommendations 716. For example, in FIG. 7, the recommendation(s) 716 indicate that some devices do not have the camera feature and that the lack of this feature may be the cause of the application crashing. In such cases, camera actions should be gracefully handled. That is, for devices that do not have the camera feature, the recommendation(s) 716 for preventing the application from crashing may include disabling the camera option or displaying an appropriate message (e.g., "No camera feature available") to indicate that the device does not have the feature.

In some embodiments, the test report 700 may further include one or more technical blurbs 718 regarding how to fix the issue (e.g., "How to fix it"). For example, in some cases, the test report 700 may include the blurb(s) 718 when the test report 700 is presented to the third-party application developer, while in other cases, the test report 700 may not include such blurb(s) 718 when the test report 700 is presented to another tester. In the example illustrated, the blurb(s) 718 may indicate to the third-party developer that he or she can detect device features for the particular device(s) 708 in several different ways. For example, the user 102 may query a package manager, perform reflection, or check the result of convenience methods. Further, the blurb(s) 718 may indicate to the third-party developer that he or she can determine if camera intent is available using PackageManager to determine if the camera software is installed on the device.

In some cases, the one or more technical blurbs 718 may include sample code 720 to fix the issue. For example, in FIG. 7, comments indicate that the sample code 720 may determine if the current device can handle an image capture action. The sample code 720 may return a result of true if the device can handle the image capture action and may return a result of false if the device cannot.

Figure 8:
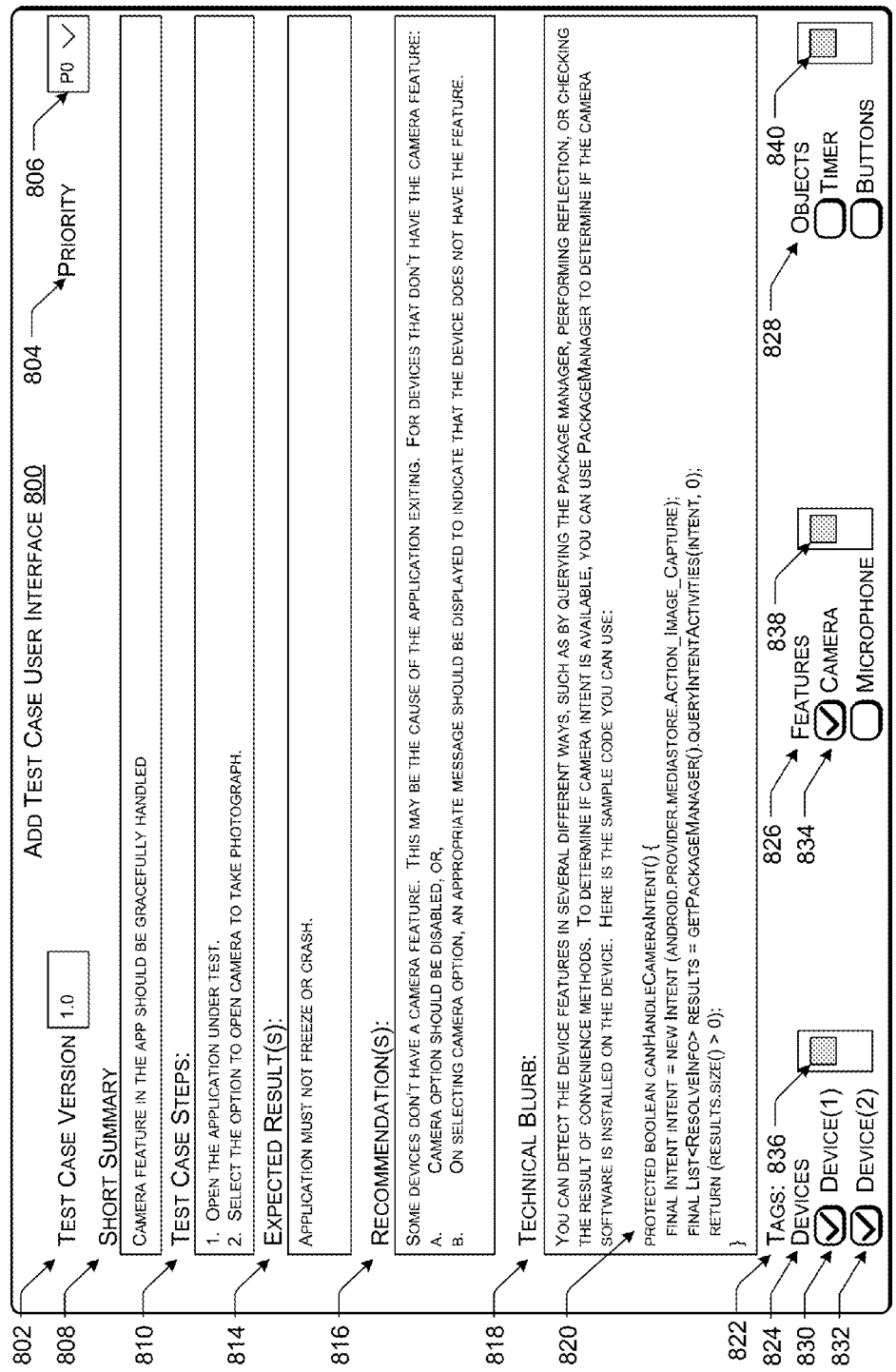
FIG. 8 illustrates an example of a user interface that allows a user (e.g., a third-party application developer or a tester) to add a test case, according to some implementations.

Referring to FIG. 8, a particular example of a user interface 800 for adding a test case is illustrated. In some embodiments, the user interface 800 of FIG. 8 may be displayed in response to selection, by the user 102, of the add test cases option 138 presented via the user interface 104 of FIG. 1. That is, in some cases, the user interface 800 may allow a third-party application developer to manually specify one or more parameters associated with a test case to be added. Alternatively, the user interface 800 may be presented to another tester (e.g., a tester associated with an application store).

In the example of FIG. 8, the user interface 800 allows the user to identify a test case version 802 (e.g., version "1.0") and to assign a priority 804 to the new test case (e.g., by selecting a priority value of "P0" from a dropdown window 806). In some cases, a priority value of P0 may represent a test case that a particular platform may specify as a test case that the application is to pass prior to launch of the application, while other priority values such as P1 or P2 may represent optional test cases that may improve a user experience but that represent a lower priority for testing purposes. Further, the user interface 800 allows the user to provide a short summary 808 of the test case and to identify one or more test case steps 810 to execute the test case. To illustrate, in the example of FIG. 8, the short summary 808 includes "Camera feature in the app should be gracefully handled," while the steps 810 to execute the test case include a first step of opening the application under test and a second step of selecting the option to open the camera to take a photograph.

The user interface 800 further allows the user to identify expected result(s) 814 (e.g., the "application must not freeze or crash"). Further, in some cases, the user interface 800 may allow the user to provide recommendation(s) 816 and to provide a technical blurb 818 that may include sample code 820 for executing the new test case. For ease of illustration, the expected result(s) 814 and the recommendation(s) 816 identified in FIG. 8 correspond to the expected result(s) 714 and the recommendation(s) 716 described with respect to FIG. 7. Further, the technical blurb 818 and the sample code 820 correspond to the technical blurb 718 and the sample code 720 of FIG. 7, respectively.

The user interface 800 further allows the user to define one or more tags 822 to be associated with the new test case by selecting various possible test areas that may be applicable for the application. To illustrate, the possible test areas may include one or more devices 824 for testing, one or more features 826 for testing, or one or more objects 828 for testing, among other alternatives.

In the example illustrated in FIG. 8, a checkmark icon is used to illustrate that a particular device, feature or object has been selected for the test case to be added. However, this is merely for illustrative purposes only. FIG. 8 illustrates a particular example in which two devices 830 and 832 are selected for testing (identified as "Device(1)" and "Device(2)" in FIG. 8), a single feature is selected for testing (e.g., a "Camera" feature 834), and none of the objects 828 are selected for testing. FIG. 8 further illustrates that, in some cases, the user may scroll through a list of the devices 824 that are available for testing using a first selectable scroll option 836. FIG. 8 further illustrates that, in some cases, the user may scroll through a list of the features 826 that are available for testing using a second selectable scroll option 838. FIG. 8 further illustrates that, in some cases, the user may scroll through a list of the objects 828 that are available for testing using a third selectable scroll option 840.

Figure 9:
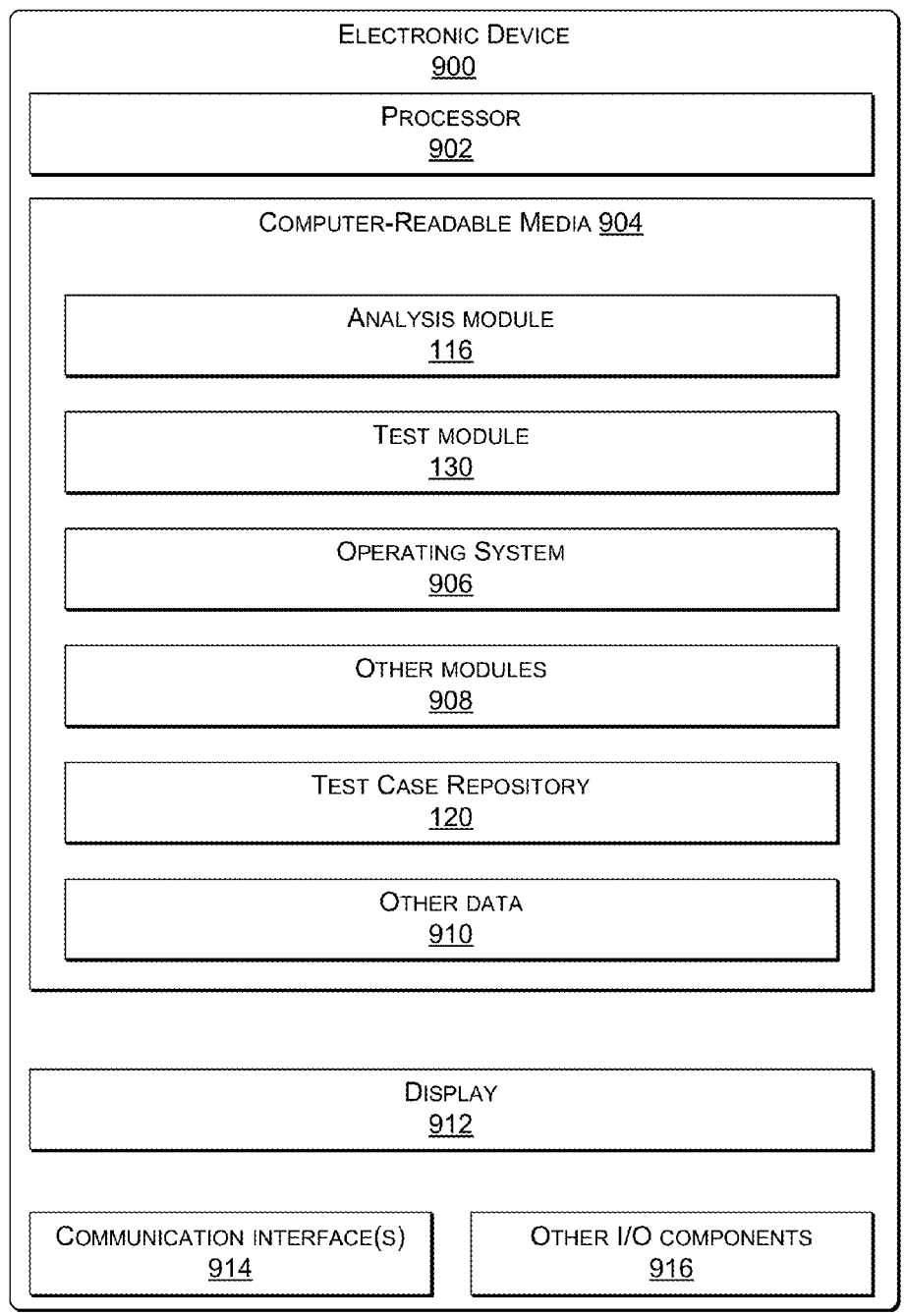
FIG. 9 illustrates select components of an example electronic device configured to perform one or more operations associated with automated application testing, according to some implementations.

FIG. 9 illustrates select example components of an electronic device 900 that may be used to implement the functionality described above according to some implementations. The electronic device 900 illustrated in FIG. 9 may correspond to the one or more computing devices 112 of FIG. 1. In a very basic configuration, the electronic device 900 includes, or accesses, components such as at least one processor 902 and a computer-readable media 904. Each processor 902 may itself comprise one or more processors or cores. The processor(s) 902 can be configured to fetch and execute computer-readable instructions stored in the computer-readable media 904 or other computer-readable media.

The electronic device 900 may be implemented as any of a number of electronic devices. Furthermore, in some implementations, the electronic device 900 may include a display of a desktop or other computing device, a gaming system, a television, other home electronics devices, and so forth.

Depending on the configuration of the electronic device 900, the computer-readable media 904 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 902 directly or through another computing device. Accordingly, the computer-readable media 904 may be computer-readable media able to maintain instructions, modules or components executable by the processor 902.

The computer-readable media 904 may be used to store any number of functional components that are executable by the processor 902. In some implementations, these functional components comprise instructions or programs that are executable by the processor 902 and that, when executed, implement operational logic for performing the actions attributed above to the electronic device 900. Functional components of the electronic device 900 stored in the computer-readable media 904 may include the analysis module 116 and the test module 130 as described above with respect to FIG. 1, which may be executed on the processor 902. Other functional components may include an operating system 906 for controlling and managing various functions of the electronic device 900. Depending on the type of the electronic device 900, the computer-readable media 904 may also optionally include other functional components, such as other modules 908, which may include applications, programs, drivers and so forth.

The computer-readable media 904 may also store data, data structures, and the like that are used by the functional components. For example, the computer-readable media 904 may store the test case repository 120, as described above with respect to FIG. 1. The electronic device 900 may also include other data 910, which may include, for example, data used by the operating system 906 and the other modules 908. Further, the electronic device 900 may include many other logical, programmatic and physical components, of which those described are merely examples that are related to the discussion herein.

FIG. 9 further illustrates that the electronic device 900 may include a display 912, which may be passive, emissive or any other form of display. In one implementation, the display 912 may be an active display such as a liquid crystal display, plasma display, light emitting diode display, organic light emitting diode display, and so forth.

One or more communication interfaces 914 may support both wired and wireless connection to various networks, such as cellular networks, radio, WiFi networks, short-range or near-field networks (e.g., Bluetooth®), infrared signals, local area networks, wide area networks, the Internet, and so forth. The communication interface(s) 914 may further allow a user to access storage on another device, such as a user's computing device, a network attached storage device, or the like.

The electronic device 900 may further be equipped with various other input/output (I/O) components 916. Such I/O components may include a touchscreen and various user actuatable controls (e.g., buttons, a joystick, a keyboard, a mouse, etc.), speakers, a microphone, a camera, connection ports, and so forth. For example, the operating system 906 of the electronic device 900 may include suitable drivers configured to accept input from a keypad, keyboard, or other user actuatable controls and devices included as the I/O components 916. For instance, the user actuatable controls may include page turning buttons, navigational keys, a power on/off button, selection keys, and so on. Additionally, the electronic device 900 may include various other components that are not shown, examples of which include removable storage, a power source, such as a battery and power control unit, a global positioning system (GPS) device, a PC Card component, an accelerometer, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors;
one or more computer-readable media coupled to the one or more processors;
an analysis module maintained on the one or more computer-readable media and executed on the one or more processors to:
receive, for an application to be tested, an application binary file from an electronic device;
perform one or more static analysis operations on the application binary file to determine one or more application parameters, wherein the application parameters represent one or more features that are supported or used by the application, wherein the one or more features include at least one of a camera feature, a microphone feature, a maps feature, an accelerometer feature, a performance feature, or an in-application purchase feature;
determine one or more keywords that are associated with individual application parameters of the one or more application parameters; and
determine one or more test cases based on the one or more keywords; and
a test module maintained on the one or more computer-readable media and executed on the one or more processors to:
receive the one or more test cases;
generate a test plan based on the one or more test cases;
execute at least a portion of the test plan;
generate a test report that includes (i) a list of test cases that failed during execution and (ii) one or more potential solutions associated with individual test cases that failed; and
send the test report to the electronic device.

2. The system as recited in claim 1, wherein performing the one or more static analysis operations on the application binary file includes determining at least one of: a version of an operating system of the electronic device, one or more software development kit (SDK) versions, one or more user permissions, one or more layout objects, or one or more application programming interfaces (APIs).

3. The system as recited in claim 1, wherein the test module is further executed on the one or more processors to:
receive, via a test plan generation user interface, information associated with at least one of:
one or more devices upon which the application is to be tested;
individual features of the one or more features to be tested; or
one or more objects to be tested, wherein the one or more objects include at least one of a timer object, a button object, a zoom-in object, a zoom-out object, a scrolling object, a text box object, or an Internet object; and
receiving, via the test plan generation user interface, an indication to generate the test plan based at least in part on the information.

4. The system as recited in claim 1, wherein generating the test report includes:
generating a summary of a failed test case;
generating a list of steps to reproduce the failed test case;
generating an observed result of the failed test case; and
generating an expected result of the failed test case.

5. The system as recited in claim 4, wherein generating the test report further includes:
determining recommendation information that includes a possible cause of the failed test case;
determining software code that is usable by a developer to address the failed test case; and
sending the recommendation information and the sample code to the electronic device for display to the developer.

6. A method comprising:
under control of one or more processors,
receiving, for an application to be tested, an application binary file from an electronic device;
performing one or more static analysis operations on the application binary file to determine one or more application parameters;
determining one or more keywords that are associated with individual application parameters of the one or more application parameters;
determining one or more test cases based on the one or more keywords; and
generating a test plan based on the one or more test cases.

7. The method as recited in claim 6, wherein the one or more application parameters include at least one of:

a user permission to be used by the application;
an application programming interface (API) to be used by the application;
an API version associated with the API to be used by the application;
a software development kit (SDK) version;
a hardware feature of the electronic device to be used by the application;
a software feature of the electronic device to be used by the application;
a layout object to be used by the application; or
style details to be used by the application.

8. The method as recited in claim 6, further comprising:
executing at least one test case of the one or more test cases; and
generating a test report that includes results associated with execution of the at least one test case.

9. The method as recited in claim 8, wherein the test report identifies a problem encountered during execution of the at least one test case and information regarding a potential solution to the problem.

10. The method as recited in claim 9, wherein the information includes software code usable to address the problem.

11. The method as recited in claim 6, wherein the one or more test cases include at least one test case that is to be executed manually on the electronic device.

12. The method as recited in claim 11, further comprising:
receiving, via a network, information from the electronic device that includes a result of executing the at least one test case; and
storing the result in a test case repository.

13. The method of claim 6, further comprising:
receiving, from the electronic device, information associated with an additional test case to be performed, wherein the electronic device includes a first type of electronic device and wherein the additional test case is to be performed on a second type of electronic device; and
updating the test plan to include the additional test case.

14. The method of claim 6, further comprising sending the test plan to the electronic device, wherein the test plan identifies an expected behavior associated with execution of the one or more test cases.

15. One or more non-transitory computer-readable media maintaining instructions executable by one or more processors to perform operations comprising:
receiving, for an application to be tested, an application binary file;
performing one or more static analysis operations on the application binary file to determine one or more application parameters;
determining one or more keywords that are associated with individual application parameters of the one or more application parameters;
querying a test case repository to identify one or more test cases that are associated with the one or more keywords;
executing, without user input, at least one test case of the one or more test cases; and
generating a test report that includes results associated with execution of the at least one test case.

16. The one or more non-transitory computer-readable media as recited in claim 15, wherein:
the test report includes information associated with a problem encountered during execution of the at least one test case; and
the test report includes information regarding one or more potential solutions to the problem.

17. The one or more non-transitory computer-readable media as recited in claim 16, wherein the information includes software code usable to address the problem.

18. The one or more non-transitory computer-readable media as recited in claim 17, wherein:
the software code is generated by a tester associated with an application store; and
the software code is usable by a third-party developer to address the problem prior to re-submission of an updated application binary file to the application store for testing.

19. The one or more non-transitory computer-readable media as recited in claim 15, the operations further comprising providing a selectable option to delete a particular test case from the one or more test cases.

20. The one or more non-transitory computer-readable media as recited in claim 19, the operations further comprising providing a second selectable option to save a test plan that has been updated to remove the particular test case.

* * * * *